United States Patent

[11] 3,583,137

[72] Inventor Franklin R. Lozen
 29155 Tawas, Madison Heights, Mich. 48071
[21] Appl. No. 803,042
[22] Filed Feb. 27, 1969
[45] Patented June 8, 1971

[54] COMBINATION LAWN MOWER AND DUMP CART COLLECTOR
5 Claims, 8 Drawing Figs.
[52] U.S. Cl. ................................................ 56/194
[51] Int. Cl. ............................................. A01d 35/22
[50] Field of Search ......................................... 56/202, 194, 206, 207, 24, 25.4

[56] References Cited
UNITED STATES PATENTS
2,959,904 11/1960 Ferris .......................... 56/202X
3,199,277 8/1965 Moody ......................... 56/202X
3,499,275 3/1970 Lozen .......................... 56/202

Primary Examiner—Robert Peshock
Attorney—Hauke, Krass, Gifford and Patalidis

ABSTRACT: A riding self-propelled lawn mower having a cowling or housing provided with a discharge opening to which is attached a grass catcher in the form of a conical open ended funnel providing a suction head for clippings, leaves and the like, the large end being attached to a chute or duct provided to convey the clippings, leaves or the like into a canvas covered, one wheel dump cart or utility trailer towed by the lawn mower.

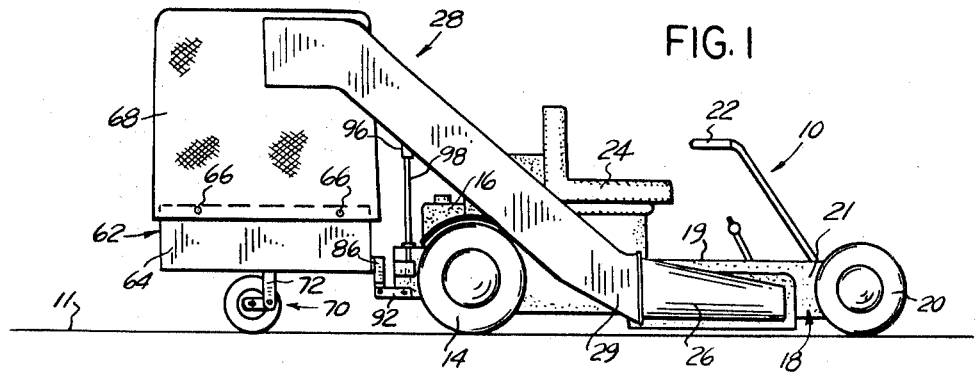
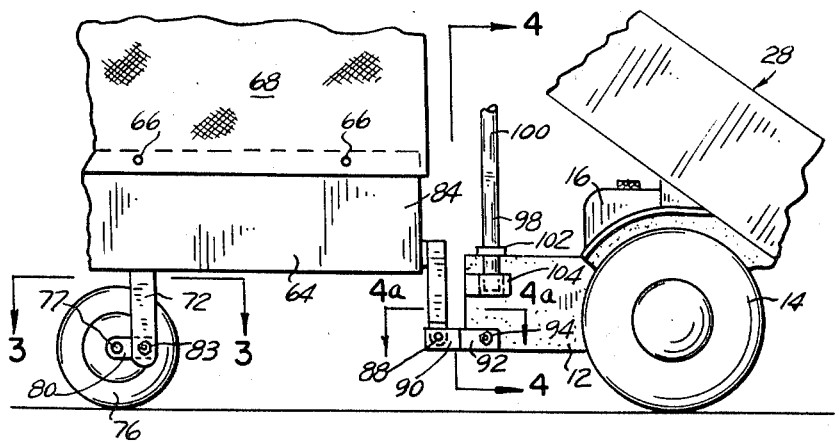
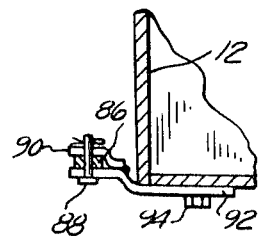
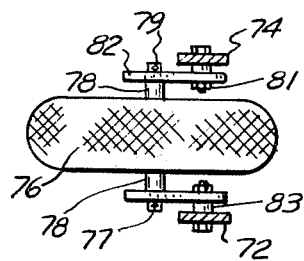
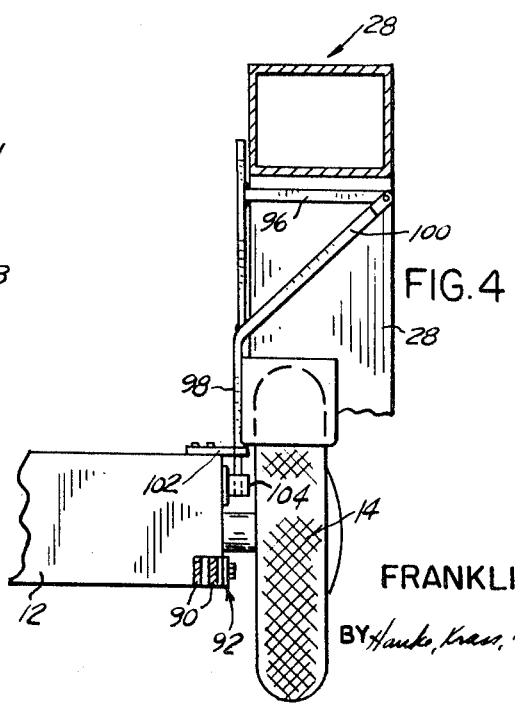
INVENTOR
FRANKLIN R. LOZEN
BY Hauke, Krass, Gifford, & Patalidis
ATTORNEYS

INVENTOR
FRANKLIN R. LOZEN

ATTORNEYS

COMBINATION LAWN MOWER AND DUMP CART COLLECTOR

BACKGROUND OF THE INVENTION

1. Field of the Invention

The present invention relates to lawn mowers or lawn sweepers, and more particularly to a riding, self-propelled lawn mower having a novel chute or duct arrangement for propelling clippings, leaves or the like into a dumpcart or utility trailer for collection, and further relates to a novel combination of a riding self-propelled lawn mower and a dumpcart which is towed by the lawn mower by a nonsteering hitch connection and which is supported on a single central wheel with torsion bar suspension.

2. Description of the Prior Art

Power mowers in general and rotary power mowers in particular, whether they are of the pushing, self-propelling or riding type, have a housing or cowling enclosing the cutting blade or blades. The housing usually has a lateral opening for the discharge of the clippings, leaves, debris or the like. Means are provided on the discharge opening for releasable attachment of a collection bag which normally will be required primarily for convenience to eliminate the need for raking of the clippings, but which is provided additionally for safety's sake since the clippings, leaves, debris and the like picked up from the ground are propelled through the discharge opening at an extremely high velocity. Thus, any relatively heavy debris, such as twigs, stones, or the like, ejected through the discharge opening, represents a safety hazard without the provision of a collection bag to cover the discharge opening.

Preferably the discharge opening is designed to most efficiently deliver the clippings or the like from the blade housing into the collection bag without clogging of the discharge. For this purpose, it is known to attach an intermediate duct or funnel to the discharge opening, disposed between the discharge opening and the collection bag, to provide an efficient passageway for directing the clippings or the like into the collection bag. The passage of the duct or funnel is usually parallel to the ground and in a direction tangential to the circle described by the rotating cutting blades. An example of this structure is disclosed in Applicant's U.S. Pat. No. 3,499,275.

Although these conventional structures are ordinarily considered to be adequately efficient, they nevertheless suffer from a series of drawbacks which often cause clogging and/or backstopping within the intermediate connecting duct due to inefficient deflector design within the duct and insufficient suction or propelling force to effectively carry the clippings or the like into the collection bag.

However, the primary disadvantage of these conventional arrangements is found to be in the limited capacity of the collection bag, which thus has to be emptied frequently, making grass cutting a tedious and time consuming operation.

Thus, more recently and especially since the introduction of riding lawn mowers, dumpcarts or utility trailers to be trailed behind the lawn mower have been proposed for collection of the clippings, leaves, debris or the like, the dumpcarts or utility trailers being of sufficient size to hold a large amount of these clippings or debris, and easily movable to a dumping place for disposal.

In one particular known structure of this kind, the dumpcart is provided with an upwardly extended canvas cover to increase the capacity of the dumpcart and the discharge opening of the lawn mower housing is connected to an opening near the top of the canvas cover of the dumpcart by a flexible pipe or chute adapted to convey the clippings, leaves, debris or the like from the discharge opening of the mower into the dumpcart, which is trailed behind the self-propelled mower. This known construction requires employment of a suction blower for the transport of the clippings into the dumpcart since the ejection point for the clippings or the like is at a much higher elevation than the discharge opening and the inherent propelling force from the operation of the lawn mower is not sufficient to effectively propel the clippings or the like all the way up through the inclined chute. The provision of a blower in this known construction requires a power takeoff from the transmission of the self-propelled lawn mower to drive the blower which further complicates the mechanical structure of this known apparatus at increased expense. Additionally, further serious drawbacks are caused by the provision of a circular flexible pipe or tube which causes the clippings or the like to move vortically around the inner diameter of the circular conduit thereby dispersing most of their initial energy which has to be compensated for by an increased capacity of the blower. The further problem inherent in the known structure is in relation to the flexibility of the circular chute which frequently causes the chute to become clogged or to backstop at the various points of directional change of the chute unless a blower of increased capacity is provided to prevent clogging of the chute. This frequent clogging condition in the known apparatus due to the flexibility of the chute is further aggravated by the manner in which the dumpcart or utility trailer is hitched to the towing vehicle or the mower. In the known apparatus, the dumpcart or utility trailer is hitched to the self-propelled mower by means of a draw bar connection preventing the dumpcart from true-tracking behind the mower; that is, at any change in the traveling direction of the mower, the dumpcart will assume an angular position relative to the towing mower, further causing various directional changes in the flexible chute, and thereby additionally enhancing the clogging or backstop problem.

SUMMARY OF THE INVENTION

The present invention contemplates an improved combination self-propelled lawn mower, sweeper or the like and dumpcart or utility trailer having an improved structure to overcome the foregoing disadvantages of the known apparatus.

The present invention comprises a self-propelled lawn mower, sweeper or the like, preferably of the riding type, as a towing vehicle, having hitched thereto in close proximity, by a nonpivotal connection, a dumpcart or utility trailer. The trailer or dumpcart is attached to the towing vehicle in such a way as to constantly and accurately track behind it regardless of any directional changes of the towing vehicle. In other words, the present novel structure comprises a unitary vehicle.

The dumpcart or utility trailer is preferably provided with an upwardly extendable canvas covering to increase the holding capacity of the dumpcart for loose clippings, leaves, and the like. The canvas extension is provided near the top and has an opening which is connected with the discharge opening of the lawn mower, sweeper or the like by means of an inflexible, inclined chute of preferably square or rectangular cross section. The upper end of the inclined rectangular chute is directly connected to the opening of the canvas top of the dumpcart and the lower end of the chute is connected to an intermediate duct or funnel which is attached to the discharge opening of the lawn mower to initially receive the clippings or the like expelled through the discharge opening. The duct or funnel is of a general construction as described above and in the aforementioned copending application, but is improved in the present application by the provision of an internal deflector baffle adapted to deflect the ejected clippings or the like in such a manner that they will be forced to travel in a general diagonal linear path up through the inclined chute without imparting any energy absorbing spiral motion to the clippings. The present novel structure is such that the propelling force produced by the revolving cutting blades in conjunction with the suction air inlet provided at the intermediate duct as disclosed in the aforementioned copending application Ser. No. 651,909, is sufficient to force the picked-up material up through the straight passageway of the rectangular tube without the need of a blower.

The present novel structure is of further advantage in that the chute is of considerably shorter length than chutes used in previously known devices. This is accomplished by the provision of novel means to attach the dumpcart directly to the towing vehicle in maximum close proximity thereto without the use of a spacing tow-bar.

A further improved feature of the present invention resides in the provision of only a single wheel supporting the dumpcart which tracks in the center of the spaced wheels of the towing vehicle. This is made possible by the hitchless connection of the dumpcart to the towing vehicle, thus further increasing the tracking ability and decreasing the cost of the apparatus.

Still another improved feature embodied in the present novel structure is the internal reflector baffle within the discharge duct which cooperates with the air intake of the duct to considerably improve the propelling motion and direction of movement of the clippings, debris or the like.

Still further advantages and novel features will become apparent by the following detailed description in connection with the accompanying drawings.

BRIEF DESCRIPTION OF THE DRAWINGS

The following description refers to the appended drawings in which like reference characters refer to like parts throughout the several views and in which:

FIG. 1 is a side view of the complete vehicular unit, including a lawn mower, a dumpcart attached thereto and a transfer chute for the clippings;

FIG. 2 is an enlarged detail view of the hitchless dumpcart construction attached to the lawn mower of the vehicular unit shown in FIG. 1;

FIG. 3 is a cross section through the novel, single wheel suspension for the dumpcart in FIGS. 1 and 2;

FIG. 4 is an enlarged transverse cross section through the improved towing attachment of the dumpcart to the lawn mower of the unit shown in FIGS. 1 and 2;

FIG. 4A is a further cross section through the dumpcart towing attachment taken along line 4a—4a in FIG. 2;

DESCRIPTION OF THE PREFERRED EMBODIMENT

Figure 5:
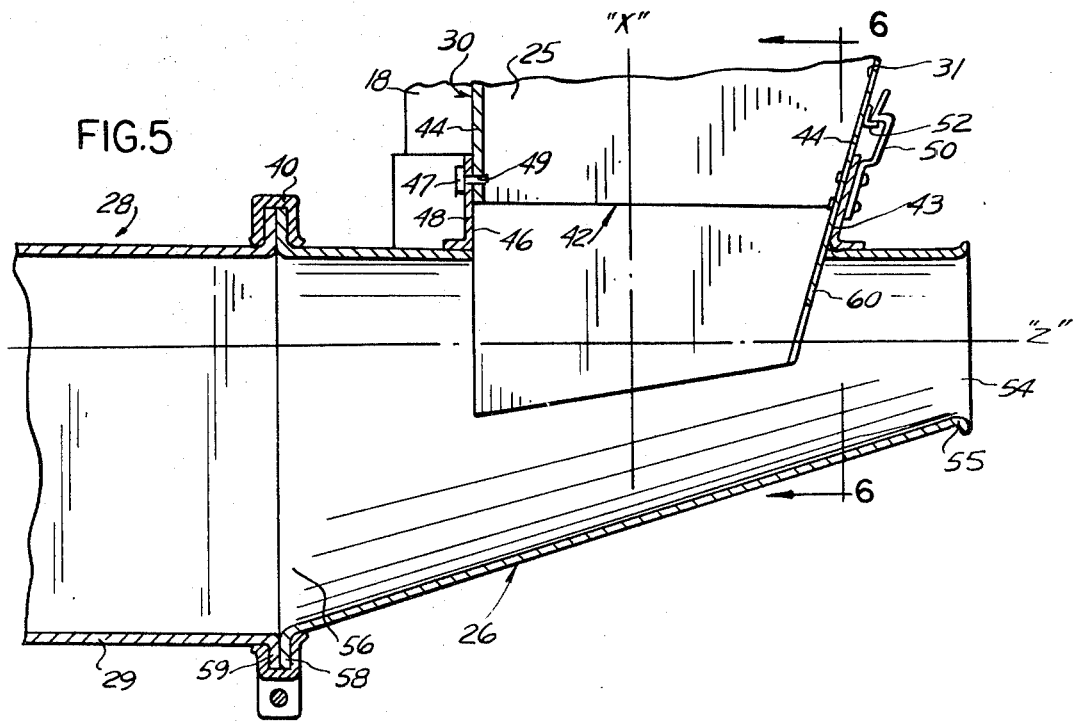
FIG. 5 is an enlarged cross section through the discharge opening and the intermediate duct and chute connection of the present novel unit shown in FIG. 1.

With reference now to the drawings, FIG. 1 illustrates a rotary power mower 10 intended to be propelled along a predetermined path over the ground 11 in the well-known manner. The preferred embodiment of the invention is employed in a rotary mower of the riding type, including a frame or chassis 12 supported upon a pair of driving rear wheels 14 which are driven by an engine 16 mounted on the chassis 12. Forwardly, the chassis 12 extends into a housing or cowling 18 supported on a pair of steerable front wheels 20 which are adapted to be manipulated by a steering handle or the like 22. Intermediate the front and rear wheels, a seat 24 is mounted on the chassis 12 to permit the operator to sit down for convenient operation of the mower 10.

The housing or cowling 18 encloses a cutting blade or blades (not shown) adapted to be rotated by the engine 16 about a vertical axis at a predetermined height from the ground to cut the grass. The grass clippings are then delivered from the cowling 18 through an intermediate duct attached to the cowling, which is generally indicated at 26, into a collection chute 28, the construction of which provides a primary feature of the present invention.

Figure 6:
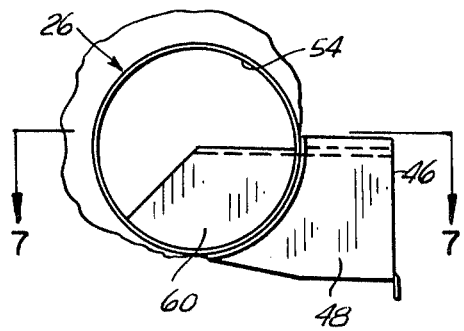
FIG. 6 is a transverse cross section through the structure shown in FIG. 5 as seen along line 6—6 thereof.
Figure 7:
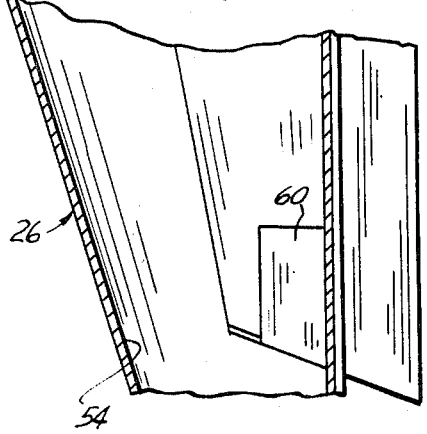
FIG. 7 is a partial longitudinal cross section through the structure shown in FIGS. 5 and 6 as seen along lines 7—7 of FIG. 6.

With particular reference to FIGS. 5—7, the cowling 18 has a deck 19 from which extend circumferentially downwardly depending sides 21 which merge at one side of the cowling into a conduit 30 forming a clipping discharge opening 25, as best seen in FIG. 5. The discharge conduit 30 is formed with inclined sides 31 so that the clippings are delivered in a lateral direction relative to the movement of the mower 10 as it travels along.

The deck 19 of the cutting blade cowling or housing 18, as mentioned before, has a discharge opening 25 on one side of the lawn mower preferably disposed at the center thereof, which provides an outwardly extending mouth 42 formed by flanges 44 disposed to constitute an opening of generally rectangular cross section.

The mouth 42 of the discharge opening 25 is disposed forwardly of a rearwardly slanting side 31, which is inclined at an angular direction substantially tangential to the circle described by the cutting blades of the lawn mower. Thus, any debris provided by the rotating cutting blades is moved rotationally around the inside of the cowling 18 and then tangentially out through the discharge opening 25 at a relatively high speed.

The intermediate conical duct 26 is detachably secured to the discharge opening 25 by means of a lateral opening 46, which has an axis "X" extending generally transverse to the longitudinal axis "Z" of the intermediate duct. The opening 46 is provided with flanges or brackets 48 adapted to match or extend around the flanges of the discharge opening to be in alignment with the discharge opening 25 around the mouth 42 to provide a closed, continuous conduit.

By way of example, the instant intermediate duct will be attached by means of a button 47 secured to one side of flange 48 and adapted to fit into an appropriate aperture 49 of the discharge opening flange 44. A releasable, springlike clamp 50 is secured to the side opposite from the button 47, and is adapted to be snapped over a tongue or the like 52 provided on the flange 44 of the discharge opening 25.

As mentioned before, the intermediate duct 26 is constructed in general of a conical sheet metal body having its lateral inlet opening 46 disposed in alignment with the discharge opening 25 of the deck 19 of the cowling 18. The conical duct 26 along its axis "Z" has a narrow venturilike opening 54 at its forward end provided with a flared out mouth 55 adapted to draw in air, as will be subsequently explained. The opposite end of the duct 26 is provided with a conically enlarged opening 56 provided with a circumferentially extending flange 58 adapted to abut and to be in lateral contact with a matching flange 59 at the end of the transistory portion 29 of the collection chute 28. By means of the face-to-face abutting flanges 58 and 59, the collection chute is attached to the intermediate duct 26 by way of a pipe clamp 40 or the like as mentioned before.

With further reference to FIGS. 5—7, the intermediate duct 26 is provided internally with a baffle 60 which is a continuation of the slanted side 43 of the inlet opening 46. The baffle 60 extends transversely in an angular direction into the intermediate duct 26 to deflect the clippings or the like entering the duct through the opening 46. Thus the clippings or the like are deflected into the path of the suction airflow entering through the venturi opening 54. The intermediate duct portion is of circular cross section, preventing the clippings from assuming a vortex motion, but instead, the clippings or the like are caused to deflect from the opposite wall of the intermediate duct so as to be caught by the suction airflow entering through the venturi opening 54 and are thus propelled axially along the duct and into the chute 28.

Referring back to FIGS. 1—4 and 4a, the self-riding type lawn mower 10 is adapted to tow a cart or utility trailer 62 or the like in close proximity thereto, which is adapted to receive and collect the clippings or the like uprooted by the cutting blades of the lawn mower.

The cart 62 has a panel or box-type body 64 having means 66 to attach a canvas or the like covering 68 in upwardly extending position over the box-type body to enlarge the volume of the cart or trailer and to increase its capacity. The cart or trailer is supported centrally on a single wheel vehicle suspension 70, which is composed of a pair of suspended brackets 72 and 74 attached to the bottom of the trailer in spaced relationship. The spaced brackets 72 and 74 extend downwardly to straddle the wheel 76 which has an axle or trunnion 78. The opposite ends 77—79 of the wheel axis or trunnion 78 are pivotally attached to a pair of suspension arms 80 and 82 respectively, which in turn have their opposite ends pivotally attached as at 81 and 83 to the ends of the suspension brackets 72 and 74. The suspension pivots 81 and 83 may be constructed in the form of known torsion springs and need not be described further since it is obvious that any conventional torsion spring suspension may be employed with this type of single wheel suspension.

The front end 84 of the cart or utility trailer 62 has attached to it a pair of spaced arms or struts 86 welded or otherwise secured at the outer edges thereof and extending therefrom downwardly. The lower ends of each of the arms or struts 86 are pivotally connected by means of a pivot pin 88 between the bifurcated ends 90 of a bracket 92, which is secured to the rear end of the chassis 12 of the mower 10 by means of a fastener such as a screw 94. It will be understood that there is one bracket 92 attached to each side of the rear end of the chassis so that the trailer 62 is attached to the mower 10 at two spaced points. The attachment by means of the pivot pin 88 permits liberal movement between the trailer and the mower as the unit travels along the usually uneven ground surface. It will be noted that by means of the present novel hitch connection, the utility trailer 62 is aligned in close proximity to the mower 10 to thus enable the chute 28 to be as short as possible. It will also be noted that there is no fifth wheel or drawbar-type hitch between the mower 10 and the trailer 62 so that during all moments of travel the mower and trailer will move as a unit and there is no jack-knifing or swivel movement between the mower and the trailer during steering, assuring that the chute 28 will stay in place.

The inclined collection chute, as mentioned earlier, is attached by means of a relatively short circular transition portion 29 to the intermediate exhaust duct 26. As seen in FIG. 1, the circular transition portion 29 is inclined upwardly at a less steep angle than the main square portion of the chute 28. By this arrangement, the clippings and the like will be moved smoothly into and through the relatively steep inclined chute and propelled upwardly for disposal into the trailer 63. The initial vortex motion of the clippings within the intermediate duct 26 is smoothly transformed into a relatively linear motion as the clippings enter the square portion of the chute making it possible for the clippings to be transported upwardly with relative ease. As particularly illustrated in FIG. 4, the chute 28 is supported intermediate its upper and lower ends on a support bracket 96, which is welded or otherwise secured to the strut 98 having a diagonal arm 100 extending towards the outer end of the bracket to thus provide a solid support for the chute. The lower end of the strut 98 is detachably secured to the chassis 12 of the mower by extending through a plate 102 which is secured on top of the chassis 12 and into a support 104 attached to the side of the chassis.

The chute 28 and canvas covering 68 can be easily detached from the unit if it is desired to use the trailer 62 as a plain utility trailer.

By the provision of the novel features, as disclosed herein, a unitary lawn mower and clippings collection unit has been provided which efficiently and continuously disposes and transports clippings, debris and the like through a chute into a trailing vehicle without the necessity of an auxiliary blower. The power to move the clippings, debris and the like up through the chute 28 is solely derived from the suction of air entering the intermediate duct through the venturi opening 54. The unit will not clog up or backstop thus eliminating the necessity for temporary shutdown of the unit to clean out the duct or chute.

The present invention may be embodied in certain other forms without departing from the characteristic and essential spirit thereof, and the present embodiment is to be considered in all respects as illustrative only and not restrictive, the scope of the invention being indicated by the appended claims rather than by the foregoing description.

I claim:

1. A self-propelled vehicular landscaping assembly comprising; a towing lawn mower, clipping collection means, attachment means connecting said clipping collection means to said lawn mower for preventing jackknife motion between said collection means and said lawn mower whereby there is no pivotal movement between said collection means and said lawn mower about a vertical axis, said lawn mower having a cowling with a laterally facing discharge opening for discharging clippings in a lateral direction, an intermediate duct in the form of a truncated cone having a longitudinal axis and a lateral inlet opening transverse to said longitudinal axis and in registry with said discharge opening and an outlet opening at the large end thereof, a chute having an inlet opening in registry with said outlet opening of said intermediate duct and an outlet opening emptying into said collection means, said chute having a cross section including four sides generally perpendicular to one another.

2. An assembly as set forth in claim 1 including a transition portion having a generally circular first end in registry with said outlet opening of said intermediate duct and a four-sided second end in registry with the four-sided portion of said chute.

3. An assembly as set forth in claim 1 wherein said truncated intermediate duct is open at the small end thereof for the admission of air.

4. An assembly as set forth in claim 1 wherein said lateral inlet opening of said duct is tangent to said truncated cone portion thereof.

5. An assembly as set forth in claim 1 wherein said chute is inclined upwardly and rearwardly.